RECOVERY OF CYCLOHEXYLAMINE

Vipin D. Shah, Waukegan, Ill., assignor to Abbott Laboratories, North Chicago, Ill., a corporation of Illinois
No Drawing. Filed Feb. 6, 1964, Ser. No. 343,120
3 Claims. (Cl. 260—563)

The present invention is concerned with the recovery of cyclohexylamine from an aqueous solution of cyclohexylamine sulfate.

Cyclohexylamine sulfate is formed as a by-product in the sulfonating process of cyclohexylamine, a process widely used for the preparation of cyclohexylsulfamic acid and its salts. Cyclohexylamine sulfate also forms as a by-product in other processes and since cyclohexylamine is a relatively costly reactant or solvent, its recovery is of great importance. For instance, in the process of making salts of cyclohexylsulfamic acid, cyclohexylamine is used as a reactant and a solvent, and since for this reaction a considerable excess of cyclohexylamine is used, its recovery from the by-product mixture containing cyclohexylamine sulfate is important for the reduction of cost of cyclohexylsulfamic acid and its salts.

It has long been known that an aqueous solution of cyclohexylamine sulfate reacts instantaneously with sodium hydroxide, whereby cyclohexylamine is liberated. The reaction represented by the equation $$(C_6H_{11}NH_2)_2H_2SO_4 + 2NaOH = 2C_6H_{11}NH_2 + Na_2SO_4 + 2H_2O$$

is driven to completion in the presence of stoichiometric amounts of sodium hydroxide. The cyclohexylamine liberated during the reaction remains in solution and is recovered therefrom by evaporation or steam distillation. Cyclohexylamine forms an azeotrope with water and as a result, distillation of such a mixture usually produces an aqueous mixture of only 20–25% of cyclohexylamine content, and no concentration higher than about 45% can be obtained by this technique. This means that only a rather dilute aqueous solution of cyclohexylamine can be obtained, in spite of using a distillation step.

It is therefore an object of the present invention to provide a process for the recovery of a relatively concentrated solution of cyclohexylamine. It is another object of the present invention to provide a recovery process for cyclohexylamine from cyclohexylamine sulfate and water, producing a highly concentrated cyclohexylamine solution in a simple and economical procedure.

These and other objects are accomplished by the process consisting essentially in adding an excess over the stoichiometric amount of sodium hydroxide to an aqueous solution of cyclohexylamine sulfate, said sodium hydroxide being added in such an amount that the aqueous phase separating from said solution contains at least 9.5 grams of free sodium hydroxide per 100 grams of said aqueous phase, and separating said aqueous phase from the supernatant cyclohexylamine layer. The sodium hydroxide is preferably added in the form of a relatively concentrated, aqueous solution, but if desired it may also be added in dry form. When an aqueous solution is used, the amount of water introduced therewith must be taken into account in calculating the soduim hydroxide needed to produce an aqueous phase with at least 9.5% by weight sodium hydroxide.

In the above manner, cyclohexylamine separates as the top layer and the aqueous phase remains at the bottom. The amount of cyclohexylamine recovered depends on the concentration of the sodium hydroxide in the bottom layer, but when this bottom layer contains at least 9.5 grams of sodium hydroxide per 100 grams of solution, the top layer will contain at least 95% of the total amount of cyclohexylamine initially present in form of the sulfate salt. In contrast thereto, when the bottom layer contains only 2 grams of sodium hydroxide per 100 grams of solution, the recovery of cyclohexylamine from the top layer amounts to only about 80% of theory.

In a general embodiment of the process of the present invention, a relatively concentrated solution of sodium hydroxide in water is added to an aqueous solution of cyclohexylamine sulfate, the amount of said sodium hydroxide being chosen in such a manner that the aqueous phase separating from the mixture contains at least 9.5 grams of sodium hydroxide per 100 grams of aqueous solution. The amount of sodium hydroxide solution needed can be calculated by the formula

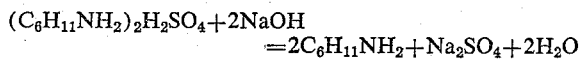

$$x = \frac{y(0.175s + 9.5)}{1.095b - 9.5}$$

wherein $x$ is the weight of the sodium hydroxide solution to be added, $y$ is the weight of the initial cyclohexylamine sulfate solution, $s$ is the concentration in percent of cyclohexylamine sulfate in solution $y$, and $b$ is the concentration of the sodium hydroxide solution used. The amount $x$ calculated by this formula then constitutes a very close approximation of the minimum amount of sodium hydroxide solution of concentration $b$ that must be added to get substantially complete recovery of cyclohexylamine from initial solution $y$ containing $s\%$ cyclohexylamine sulfate.

As stated above, the process of the present invention requires a concentration of at least 9.5% by weight of sodium hydroxide in the bottom layer to assure recovery of substantially all of the cyclohexylamine present. With this minimum concentration, the top layer still contains a substantial amount of water, e.g., about 30%. The amount of water in the top layer, however, can be reduced by increasing the concentration of sodium hydroxide in the aqueous phase beyond the minimum requirement: when the sodium hydroxide concentration is increased, for instance, to 30% in the aqueous phase, the supernatant contains only about 15% water.

In a preferred embodiment of the present inventive process, the aqueous phase is loaded so as to contain at least 30% sodium hydroxide so that the cyclohexylamine supernatant contains only about 15% water. The supernatant cyclohexylamine can easily be separated and, if desired, treated once more with a relatively concentrated sodium hydroxide solution in the manner described above. For example, when such a supernatant cyclohexylamine solution containing 66% cyclohexylamine is kept in contact with a 30% aqueous sodium hydroxide solution for 5 minutes or more, the concentration of cyclohexylamine in the resulting supernatant layer increases to 85%. Cyclohexylamine layers of such concentrations can be distilled and a cyclohexylamine of better than 99.8% purity can be obtained.

To better understand the process of the present invention, reference is made to the following examples which are meant as illustrations only.

*Example 1*

To 50 ml. of an aqueous solution containing 16.9 grams of cyclohexylamine sulfate per 100 ml. of solution, is added 10 ml. of a 52% sodium hydroxide solution (52 grams sodium hydroxide per 100 grams of solution). After brief stirring and subsequent standing, two layers form. The top layer is withdrawn and by analysis is found to contain 95% of the total amount of cyclohexylamine liberated from the initial solution. The concentration of cyclohexylamine in this layer is 66%. By treating this layer for 10 minutes with 20 ml. of a 30% sodium hydroxide solution, the separating top layer contains less than 15% water.

Example 2

In a repetition of Example 1, 20 ml. of the 52% sodium hydroxide solution is used. After separating the top layer it is found to contain 100% of the cyclohexylamine initially present. Aside from the cyclohexylamine, this layer contains 27% water.

Example 3

In a repetition of Example 1, 40 ml. of the 52% sodium hydroxide solution is used. The separated top layer contains the theoretical amount of cyclohexylamine liberated from the initially present salt in a concentration of 85%.

The new method of the present invention not only provides a simple method for the recovery of cyclohexylamine from cyclohexylamine sulfate, but it does this substantially without cost because the sodium hydroxide used can be recovered completely. It is seen from the above equation that sodium sulfate forms as a by-product in the reaction of cyclohexylamine sulfate and sodium hydroxide but sodium sulfate is insoluble in concentrated caustic solution and when the aqueous bottom layer is concentrated, sodium sulfate precipitates. It can be filtered off and the concentrated caustic solution can be reused. For example, when a bottom layer containing 9.5% sodium hydroxide and approximately 7.0% sodium sulfate is concentrated until sodium hydroxide concentration is approximately 50%, sodium sulfate precipitate substantially quantitatively and room temperature filtration produces a filtrate containing only 0.15% $Na_2SO_4$. Such a filtrate can be used again for the recovery of cyclohexylamine.

It will be apparent that in order to attain the above minimum concentration of sodium hydroxide in the aqueous phase, the necessary sodium hydroxide can be added not only in the form of a solution but also as dry powder, pellets or flakes. In that event, the term $b$ in the above equation obviously represents 100. The preferred method, however, uses a relatively concentrated solution of sodium hydroxide in water to avoid any possible difficulties in dissolving the solid sodium hydroxide.

Others may practice the invention in any of the numerous ways which will be obvious to one skilled in the art by the present disclosure. All such practice of the invention is considered a part hereof provided it falls within the scope of the appended claims.

I claim:

1. The method of recovering cyclohexylamine from an aqueous solution of cyclohexylamine sulfate consisting essentially of the steps
    adding sodium hydroxide to said aqueous solution in such an amount that the separating aqueous phase contains at least 9.5% by weight of sodium hydroxide, and
    withdrawing said aqueous phase from the formed two-phase system whereby the top layer contains at least 95% of the cyclohexylamine initially present in the form of cyclohexylamine sulfate.

2. The method of claim 1 wherein said sodium hydroxide is added as an aqueous solution.

3. The method of claim 1 wherein sufficient sodium hydroxide is added to produce an aqueous phase containing at least 30% by weight sodium hydroxide.

References Cited by the Examiner

UNITED STATES PATENTS

| | | | |
|---|---|---|---|
| 2,787,618 | 4/1957 | McCandish | 260—563 X |
| 2,804,477 | 8/1957 | McQuaid | 260—563 |

OTHER REFERENCES

Fieser et al.: "Organic Chemistry," 2nd edition, page 228 (1950).

CHARLES B. PARKER, *Primary Examiner.*

ROBERT V. HINES, *Assistant Examiner.*